Sept. 17, 1957     E. P. GRIFFITH     2,806,320
PICK-UP DEVICE FOR FLY SWATTER HANDLE
Filed Sept. 2, 1955
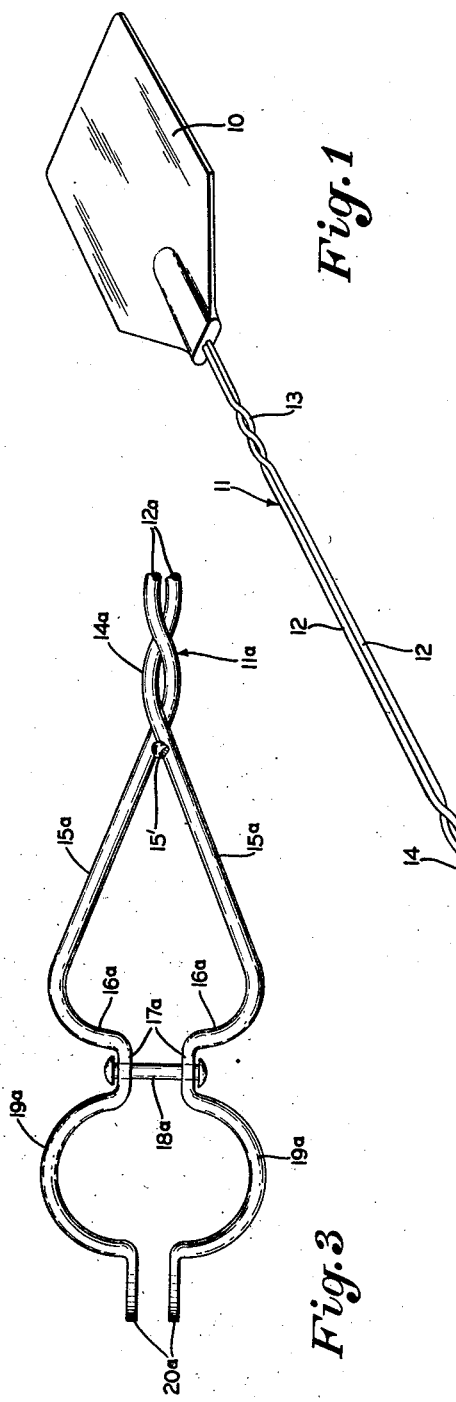
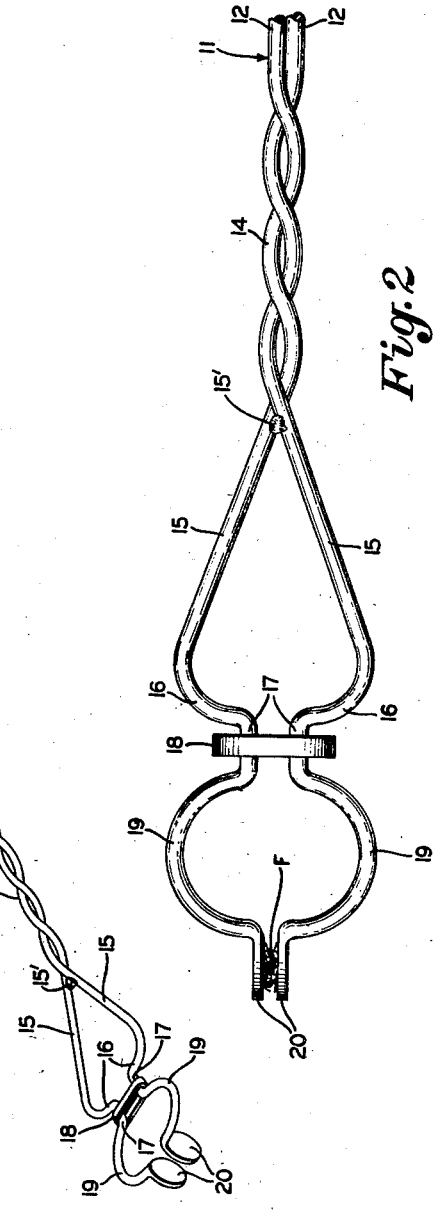
INVENTOR.
Elmer P. Griffith
BY
Frease & Bishop
ATTORNEYS United States Patent Office 2,806,320
Patented Sept. 17, 1957

2,806,320

PICK-UP DEVICE FOR FLY SWATTER HANDLE

Elmer P. Griffith, Canton, Ohio

Application September 2, 1955, Serial No. 532,178

3 Claims. (Cl. 43—137)

The invention relates to devices for picking up dead flies or other insects, and more particularly to a device of this kind located upon the handle of a fly swatter.

The object of the invention is to provide means upon the handle of a fly swatter for picking up fallen flies or other insects after they have been struck by the swatter.

Another object is to provide such an insect pick-up device as an integral part of a fly swatter handle.

A further object is to provide a fly swatter handle of conventional twisted wire construction with insect pick-up tweezers or tongs formed as extensions of the wires comprising the handle.

A still further object is to provide a pick-up device of the character referred to in which the jaws of the tweezers or tongs are in normally open position and adapted to be manually closed to pick up a fallen fly or the like.

Another object of the invention is to provide a pick-up device of this type having means limiting the normally open position of the jaws.

A further object is the provision of an insect pick-up device upon the handle of a fly swatter, which in no way interferes with the conventional and normal construction and operation of the fly swatter or the handle thereof.

And finally, it is an object of the invention to provide means upon the handle of a fly swatter for disposing of fallen flies and the like without the same coming into contact with the hands of the user.

The above and other objects which will be apparent from the drawing and following description, or which may be further referred to, may be attained by constructing and operating the improved insect pick-up device in the manner illustrated in the drawing and hereinafter described in detail.

The present invention comprises a device in the shape of tweezers or tongs formed upon the handle of a fly swatter for picking up such fallen flies after they have been struck by the swatter. For this purpose, the handle of the fly swatter may be of conventional twisted wire construction, the ends of the wires being shaped to form cooperating jaws of tweezers or tongs normally located in open position. Means, such as a loop or the like is provided for limiting the opening movement of the jaws to a relative spaced position well suited for positioning the same on opposite sides of a fly or the like to be picked up thereby, whereby the jaws may be easily closed upon the fallen insect, by slight pressure of the fingers thereon.

Having thus described the invention in general terms, reference is now made to the accompanying drawing, showing preferred embodiments of the invention, in which:

Fig. 1 is a perspective view of a conventional fly swatter showing the improved pick-up device formed upon the handle thereof;

Fig. 2 is an enlarged, fragmentary elevation of the end portion of the fly swatter handle, showing the manner in which the jaws may be pressed toward each other to pick up a fallen fly therebetween; and Fig. 3 is an enlarged, fragmentary elevation of a slightly modified form of the invention, showing the jaws in the normally open position.

Referring first to the embodiment of the invention illustrated in Figs. 1 and 2, a fly swatter is shown having a conventional swatting pad 10 connected in a usual and well known manner to one end of the handle indicated generally at 11.

This handle may be of a conventional and generally used construction of twisted wire, being formed of two similar wire members 12—12, twisted upon each other near opposite ends as indicated at 13 and 14. The portions of the wire members 12—12, between the twisted portions 13 and 14, may be straight and parallel as shown in Fig. 1.

The swatting pad 10 is attached to the end of the handle adjacent to the twisted portion 13. Beyond the twisted portion 14 at the other end of the handle, the wires 12—12 are separated and diverge as shown at 15—15, and then converge as at 16—16 into the relatively short, substantially straight, parallel portions 17—17, which may be encompassed by the substantially flat, elongated loop 18 which limits the open position of the wires as best shown in Fig. 1. For the purpose of increasing the tension upon the diverging portions 15—15 of the wires, the two wires 12—12 may be welded together at the point of divergence as indicated at 15'.

Beyond the straight, parallel portions 17—17, the wires 12—12 again diverge into the opposed U-shape portions 19—19, which terminate in longitudinally extending, flat gripping jaws 20—20, located substantially parallel to each other, and normally spaced slightly apart, as best shown in Fig. 1.

The wires 12—12 have sufficient inherent spring property to cause the portions 15—15 to normally spread apart so that the straight, parallel portions 17—17 thereof will engage opposite ends of the loop 18. This loop may be formed of flat strip metal or the like as shown in Figs. 1 and 2, or of any other suitable material.

In Fig. 3 is shown a slightly modified embodiment of the invention, in which the wire handle indicated generally at 11a is constructed in the same manner as shown in Figs. 1 and 2, being formed of two similar wire members 12a—12a, twisted together as shown at 14a.

Beyond the twisted portions 14a, the wires diverge as indicated at 15a—15a, and then converge as at 16a—16a into the relatively short, substantially straight, parallel, flattened portions 17a—17a, having a double headed pin 18a located through suitable apertures therein for limiting the opening movement of the wires as shown in Fig. 3.

Otherwise the construction is identically the same as in Figs. 1 and 2, and as above described, the wires diverging beyond the portions 17a into the opposed U-shape portions 19a—19a, which terminate in longitudinally extending flat jaws 20a—20a.

In the operation of the device, after a fly or other insect has been swatted by the fly swatter, the jaws 20—20 are positioned upon opposite sides of the fallen insect, and, by slight pressure of the portions 15—15 of the wires toward each other, the jaws 20—20 are pressed together upon the fly, as indicated at F in Fig. 2, so that the fly may easily be picked up and deposited in a waste basket or the like by simply releasing the pressure upon the diverging portions 15—15 of the wires and permitting them to spring back to their normally open position.

From the above it will be apparent that a simple, inexpensive and efficient device is provided upon the handle of a fly swatter for quickly and easily disposing of dead flies and the like in a sanitary manner and without the necessity of physical contact by the user.

In the foregoing description, certain terms have been used for brevity, clearness, and understanding, but no unnecessary limitations are to be implied therefrom beyond the requirements of the prior art, because such words are used for descriptive purposes herein and are intended to be broadly construed.

Moreover, the embodiments of the improved constructions illustrated and described herein are by way of example, and the scope of the present invention or discovery is not limited to the exact details of construction set forth.

Having now described the invention or discovery, the construction, the operation, and use of preferred embodiments thereof, and the advantageous new and useful results obtained thereby; the new and useful constructions, and reasonable mechanical equivalents thereof obvious to those skilled in the art, are set forth in the appended claims.

I claim:

1. A fly swatter handle formed of two similar wire members twisted upon each other at points near opposite ends, one end of said wire members being adapted to be attached to a swatting pad, said wires angularly diverging immediately beyond the twisted portion at the other end and then converging to points spaced from each other, then extending longitudinally in straight parallel portions, and then again diverging into opposed U-shape portions terminating in longitudinally extending normally spaced, flat jaws adapted to be operated between said normally spaced position and a closed position for clamping a dead insect therebetween, and means at said straight parallel portions of the wires for limiting the maximum spacing between said jaws.

2. A fly swatter handle formed of two similar wire members twisted upon each other at points near opposite ends, one end of said wire members being adapted to be attached to a swatting pad, said wires angularly diverging immediately beyond the twisted portion at the other end and then converging to points spaced from each other, then extending longitudinally in stragiht parallel portions, and then again diverging into opposed U-shape portions terminating in longitudinally extending normally spaced, flat jaws adapted to be operated between said normally spaced position and a closed position for clamping a dead insect therebetween, and a loop encircling said straight parallel portions of the wires for limiting the maximum spacing between said jaws.

3. A fly swatter handle formed of two similar wire members twisted upon each other at points near opposite ends, one end of said wire members being adapted to be attached to a swatting pad, said wires angularly diverging immediately beyond the twisted portion at the other end and then converging to points spaced from each other, then extending longitudinally in straight parallel portions, and then again diverging into opposed U-shape portions terminating in longitudinally extending normally spaced, flat jaws adapted to be operated between said normally spaced position and a closed position for clamping a dead insect therebetween, and a double-headed stud slidably located through openings in said parallel straight portions of the wires for limiting the maximum spacing between said jaws.

References Cited in the file of this patent

UNITED STATES PATENTS

| | | |
|---|---|---|
| 1,185,855 | Stinson | June 6, 1916 |
| 1,237,826 | Statterquist et al. | Aug. 21, 1917 |
| 1,326,577 | Cullen | Dec. 30, 1919 |
| 1,723,597 | Bannister | Aug. 6, 1929 |
| 2,362,395 | Ozdobinski | Nov. 7, 1944 |
| 2,601,487 | Zilinsky | June 24, 1952 |
| 2,653,048 | Novak | Sept. 22, 1953 |

FOREIGN PATENTS

| | | |
|---|---|---|
| 909,915 | France | 1946 |